United States Patent
Rexavier et al.

(10) Patent No.: US 10,132,216 B2
(45) Date of Patent: Nov. 20, 2018

(54) CRANKCASE VENTILATION SYSTEM FOR AN INTERNAL COMBUSTION ENGINE

(71) Applicant: Progress Rail Locmotive Inc., LaGrange, IL (US)

(72) Inventors: Raji Rexavier, Plainfield, IL (US); Joshua Schueler, New Lenox, IL (US); John Michael Carr, Chicago, IL (US); Patricia A Mcwade, Willowbrook, IL (US)

(73) Assignee: Progress Rail Locmotive Inc., LaGrange, IL (US)

(*) Notice: Subject to any disclaimer, the term of this patent is extended or adjusted under 35 U.S.C. 154(b) by 167 days.

(21) Appl. No.: 15/168,543

(22) Filed: May 31, 2016

(65) Prior Publication Data

US 2017/0342880 A1    Nov. 30, 2017

(51) Int. Cl.
*F02B 33/44*    (2006.01)
*F01M 13/02*    (2006.01)

(52) U.S. Cl.
CPC ..... *F01M 13/022* (2013.01); *F01M 2013/027* (2013.01)

(58) Field of Classification Search
CPC .............. F01M 13/022; F01M 2013/027
USPC .............................. 123/572, 559.1
See application file for complete search history.

(56) References Cited

U.S. PATENT DOCUMENTS

| | | | |
|---|---|---|---|
| 3,418,986 A | 12/1968 | Scherenberg | |
| 5,937,650 A | 8/1999 | Arnold | |
| 6,026,791 A * | 2/2000 | Arnold | F02B 37/00 123/568.27 |
| 7,021,058 B2 * | 4/2006 | Scheinert | F02B 29/0412 415/206 |
| 7,204,241 B2 * | 4/2007 | Thompson | F01M 13/021 123/572 |
| 7,698,894 B2 * | 4/2010 | Wood | F02B 37/22 123/572 |
| 7,721,542 B2 | 5/2010 | Chen | |
| 8,205,604 B2 | 6/2012 | Velosa et al. | |
| 8,322,138 B2 | 12/2012 | Jackson | |
| 8,888,440 B2 | 11/2014 | Tomita et al. | |

(Continued)

FOREIGN PATENT DOCUMENTS

| | | |
|---|---|---|
| EP | 1515010 | 3/2005 |
| EP | 1893850 | 3/2008 |
| WO | 2012099146 | 7/2012 |

*Primary Examiner* — Marguerite McMahon
(74) *Attorney, Agent, or Firm* — Hibshman Claim Construction PLLC

(57) ABSTRACT

A housing of a compressor for an internal combustion engine is provided. The housing includes a first air inlet portion. Further, housing includes a tubular wall defining an annular chamber along a circumference of the first air inlet portion. Tubular wall comprising a second air inlet portion. Housing further includes an opening formed in a wall of first air inlet portion, contiguously extending along the circumference of the first air inlet portion, to fluidly couple the annular chamber with the first air inlet portion. The opening being formed at an offset from the second air inlet portion. The opening defines a first edge and a second edge in the wall of the first air inlet portion. The first edge and the second edge are radially offset from each other with respect to a central axis of the first air inlet portion.

17 Claims, 3 Drawing Sheets

(56) References Cited

U.S. PATENT DOCUMENTS

| | | | |
|---|---|---|---|
| 9,003,791 B2* | 4/2015 | Ibaraki | F01M 13/021 123/568.17 |
| 2001/0047801 A1* | 12/2001 | Baeuerle | F01M 11/10 123/574 |
| 2012/0297768 A1* | 11/2012 | Lischer | F02B 37/00 60/605.2 |
| 2014/0116403 A1* | 5/2014 | Igarashi | F02B 39/16 123/559.1 |
| 2014/0219779 A1 | 8/2014 | Matsui | |

* cited by examiner

CRANKCASE VENTILATION SYSTEM FOR AN INTERNAL COMBUSTION ENGINE

TECHNICAL FIELD

The present disclosure relates to an internal combustion engine. More particularly, the present disclosure relates to a crankcase ventilation system for the internal combustion engine.

BACKGROUND

A typical internal combustion engine, installed in a machine, includes a combustion chamber where a mixture of fuel and air ignites to generate combustion gases. These combustion gases causes a piston in the combustion chamber to move up and down (hereinafter referred to as reciprocating motion). Usually, the piston is coupled to a crankshaft, housed within a crankcase, in such a manner that the reciprocating motion of the piston causes the crankshaft to rotate. The rotary motion of the crankshaft is utilized to drive various components of the machine.

In certain scenarios, a fraction of the combustion gases (generated during ignition of fuel and air mixture) leaks past the piston into the crankcase. Hereinafter, such gases that leak into the crankcase have been referred to as blow-by gases. It may be necessary to remove these blow-by gases from the crankcase. Usually, the blow-by gases are removed from the crankcase using crankcase ventilation system. Typically, there exist two types of crankcase ventilation systems namely open crankcase ventilation system and closed crankcase ventilation system. In the open crankcase ventilation system, the blow-by gases are removed from the crankcase and are vented out in to the atmosphere. On the other hand, in the closed crankcase ventilation system, the blow-by gases are fed back into the internal combustion engine through a compressor of the turbocharger. A typical compressor compresses a mixture of the blow-by gases and the fresh air, and feeds it back to the internal combustion engine.

The blow-by gases usually include oil droplets (from the crankcase), and it may be required to filter out the oil droplets prior to entry of the blow-by gases into the compressor. Further, when the machine operates at locations where the atmospheric temperature is below the freezing point, the water vapors in the blow-by gases may condense rapidly to form ice-crystals, on interaction of the blow-by gases with the fresh air (which could be below freezing temperature) in the compressor. The so formed ice-crystals may damage the components of the compressor such as impeller blades.

U.S. Pat. No. 9,003,791 ('791) discloses a compressor that includes a housing. The housing defines an air passage for receiving fresh air. Further, the housing includes a casing treatment chamber that is formed inside the compressor housing. The casing treatment chamber receives blow-by gases from the crankcase of the engine. The casing treatment chamber includes a plurality of first recirculation openings and a plurality of second recirculation openings that are formed along a circumferential direction of the casing treatment chamber at equal intervals. As the first recirculation opening and the second recirculation opening are intermittently formed in the casing treatment chamber, the blow-by gases exiting from these openings do not mix uniformly with the fresh air. Further, as the casing treatment chamber is formed inside the compressor housing, the casing treatment chamber may disrupt the flow of the fresh air in the compressor, which may be undesirable.

SUMMARY

Various aspects of the present disclosure disclose a housing of a compressor for an internal combustion engine. The housing includes a first air inlet portion. Further, the housing includes a tubular wall defining an annular chamber along a circumference of the first air inlet portion. The tubular wall includes a second air inlet portion. Furthermore, the housing includes an opening formed in a wall of the first air inlet portion, contiguously extending along the circumference of the first air inlet portion, to fluidly couple the annular chamber with the first air inlet portion. The opening being formed at an offset from the second air inlet portion, where the opening defines a first edge and a second edge in the wall of the first air inlet portion. The first edge and the second edge are radially offset from each other with respect to a central axis of the first air inlet portion.

Certain aspects of the present disclosure disclose a compressor for an internal combustion engine. The compressor includes a first air inlet portion configured to receive fresh air. Further, the compressor includes a tubular wall defining an annular chamber along a circumference of the first air inlet portion, the tubular wall comprising a second air inlet portion, where the annular chamber is configured to receive blow-by gases from the second air inlet portion. An opening formed in a wall of the first air inlet portion, contiguously extending along the circumference of the first air inlet portion, to fluidly couple the annular chamber with the first air inlet portion. The opening being formed at an offset from the second air inlet portion. The opening defines a first edge and a second edge in the wall of the first air inlet portion, where the first edge and the second edge are radially offset from each other with respect to a central axis of the first air inlet portion. The blow-by gases exit the annular chamber into the first air inlet portion through the opening when the blow-by gases fill the annular chamber. Further, the compressor includes an impeller, placed in an impeller cover portion, configured to receive and compress the fresh air and the blow-by gases, where the impeller cover portion is extended to form the tubular wall.

Various aspects of the present disclosure disclose a crankcase ventilation system for an internal combustion engine. The crankcase ventilation system includes a crankcase of the internal combustion engine. Further, the crankcase ventilation system includes a compressor with a first air inlet portion. The compressor further includes a tubular wall defining an annular chamber along a circumference of the first air inlet portion. The tubular wall includes a second air inlet portion that is coupled with the crankcase of the internal combustion engine through a conduit. The compressor further includes an opening formed in a wall of the first air inlet portion, contiguously extending along the circumference of the first air inlet portion, to fluidly couple the annular chamber with the first air inlet portion. The opening being formed at an offset from the second air inlet portion, where the opening defines a first edge and a second edge in the wall of the first air inlet portion, where the first edge and the second edge are radially offset from each other with respect to a central axis of the first air inlet portion. Additionally, the compressor includes an impeller placed in an impeller cover portion of the compressor, where the impeller cover portion is extended to form the tubular wall.

DETAILED DESCRIPTION

Figure 1:
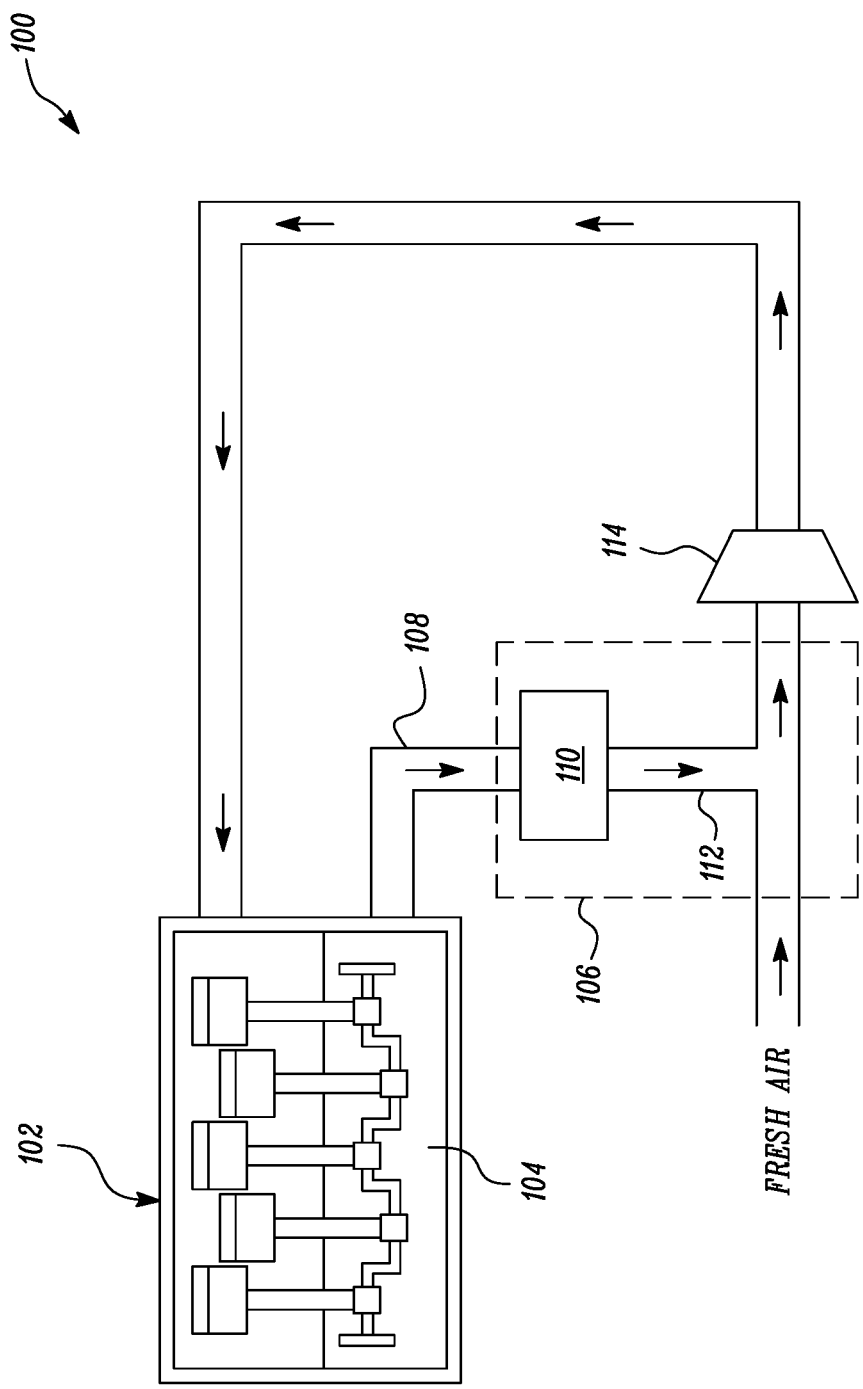
FIG. 1 illustrates a schematic of an engine system, in accordance with the concepts of the present disclosure.

Referring to FIG. 1, there is shown an engine system 100, in accordance with the concepts of the present disclosure. The engine system 100 includes an engine 102 having a crankcase 104, and a crankcase ventilation system 106 including a first conduit 108, a filtration system 110, a second conduit 112. The engine system 100 further includes a compressor 114. In an embodiment, the compressor 114 may correspond to a compressor in a turbocharger or a supercharger.

The engine 102 may be based on one of the commonly applied power-generation units, such as an internal combustion engine (ICE). The engine 102 may include a V-type engine, in-line engine, or an engine with different configurations, as is conventionally known. Although not limited, the engine 102 may be a spark-ignition engine or a compression ignition engine, which may be applied in construction machines or locomotives. However, aspects of the present disclosure, need not be limited to a particular engine type. In an embodiment, the engine 102 includes a compression chamber, a piston movable in the combustion chamber, an air inlet port and an exhaust gases outlet port. The piston is coupled to the crankcase 104 through a connecting rod. In operation, the compression chamber receives a fuel. The fuel is ignited to execute a power stroke. Combustion gases are generated during the power stroke. The ignition of the fuel causes the piston to move in the compression chamber. Further, the movement of the piston facilitates removal of the combustion gases from the combustion chamber through the exhaust gases outlet port. In some scenarios, some fraction of the combustion gases leak into the crankcase 104. Such gases are hereinafter referred to as blow-by gases.

The crankcase 104 comprises a housing that encloses a crankshaft. The crankshaft is connected to the piston (in the engine 102) through the connecting rod. In an embodiment, the piston is connected to the crankshaft in such a manner that the reciprocating motion of the piston is converted into the rotary motion of the crankshaft. In an embodiment, the crankcase 104 stores motor oil that is circulated in the engine 102 and the crankcase 104 for lubrication of the cylinder wall, crankshaft, connecting rods and other components in the engine 102 and the crankcase 104. Further, the crankcase 104 comprises a blow-by gas outlet port. The blow-by gas outlet port is fluidly coupled to the filtration system 110 through the first conduit 108. The blow-by gases exit the crankcase 104 through the blow-by gas outlet port.

The filtration system 110 includes an inlet port and an outlet port. The inlet port of the filtration system 110 is fluidly coupled to the blow-by gases outlet port of the crankcase 104 through the first conduit 108. Further, the outlet port of the filtration system 110 is fluidly coupled to the compressor 114 through the second conduit 112. In an embodiment, a pressure differential is maintained across the filtration system 110 (i.e., the inlet port and the outlet port). The pressure differential facilitates flow of the blow-by gases through the filtration system 110. In an embodiment, the pressure differential is generated based on a pressure drop caused by an operation of the compressor 114. The generation of the pressure drop in the compressor 114 has been described later. In an embodiment, the filtration system 110 includes a filtration material placed between the inlet port and the outlet port, of the filtration system 110. In an embodiment, the filtration material is configured to remove oil droplets from the blow-by gases. In an embodiment, a polymer may be used as the filtration material. However, those skilled in the art would appreciate that the scope of the disclosure is not limited to using the polymer as the filtration material. Any known filtration material may be used to remove the oil droplets from the blow-by gases.

Figure 2:
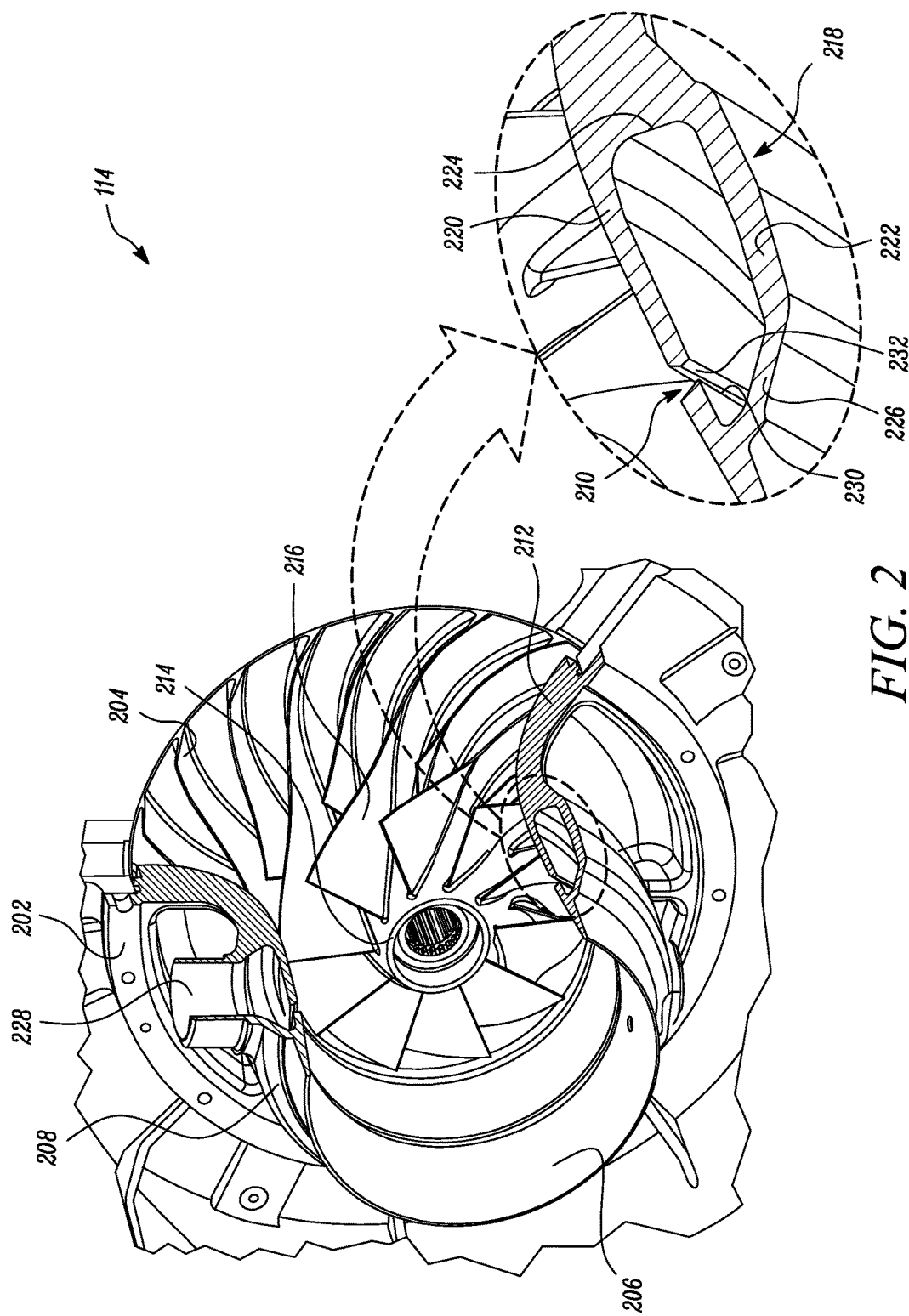
FIG. 2 illustrates a sectional view of a compressor, in accordance with the concepts of the present disclosure.
Figure 3:
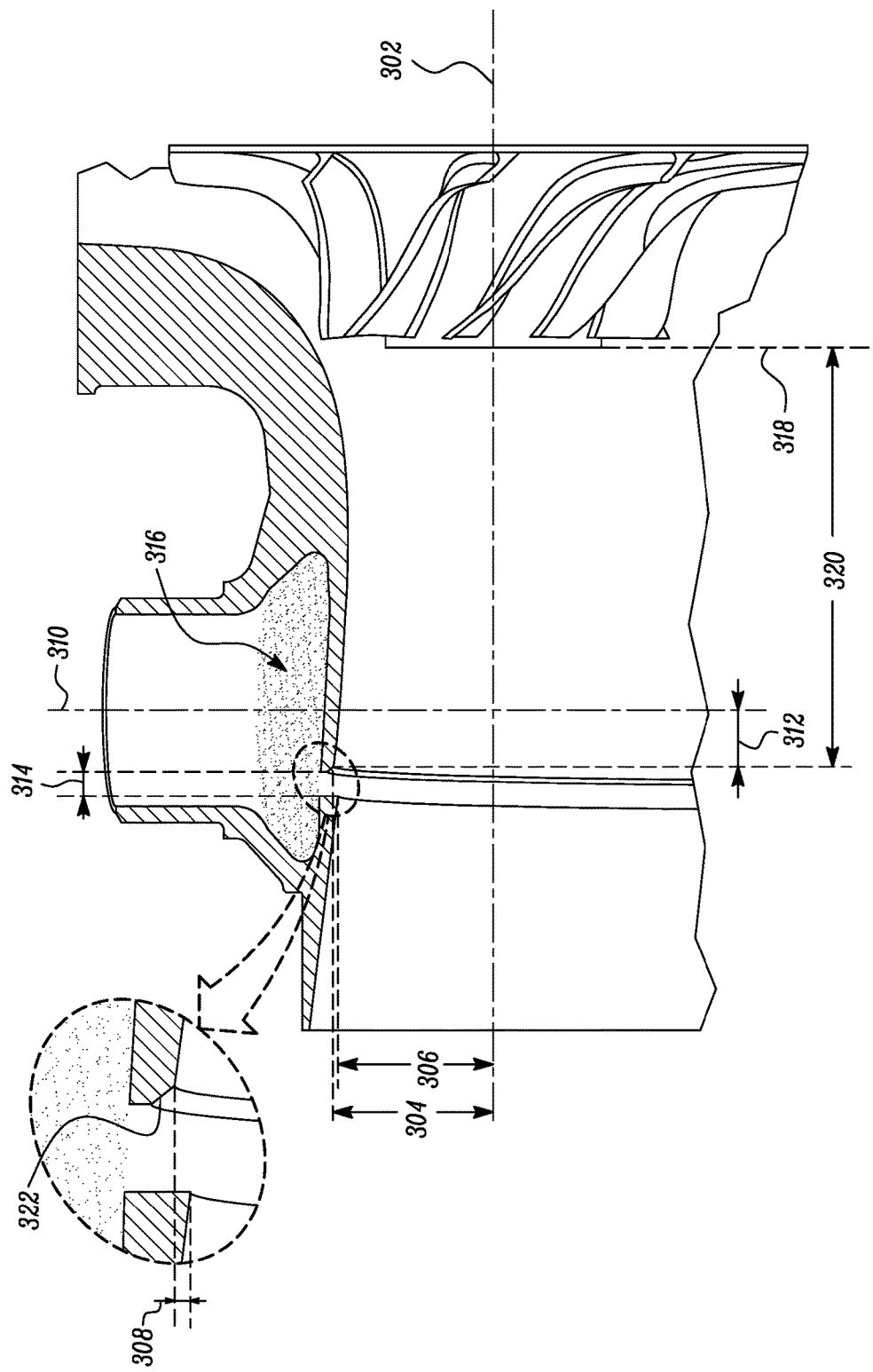
FIG. 3 illustrates a cross-sectional view of a second inlet portion in conjunction with an impeller of a compressor of the engine system, in accordance with the concepts of the present disclosure.

Referring to FIG. 1, FIG. 2, and FIG. 3, the compressor 114 includes a housing 202 and an impeller 204. The housing 202 further comprises a first air inlet portion 206, a tubular wall 208, an opening 210, and an impeller cover portion 212.

The impeller cover portion 212 is configured to receive the impeller 204. In an embodiment, the impeller 204 has a front end 214 and a plurality of blades 216. In an embodiment, the front end 214 of the impeller 204 is defined axially away from the plurality of blades 216. Further, the impeller 204 has a plane (represented by 318) passing through the front end 214 of the impeller 204 and is perpendicular to a central axis of the impeller 204. Hereinafter, the plane 318 has been referred to as the impeller plane 318.

The first air inlet portion 206 corresponds to a cylindrical wall that is defined axially away from the impeller 204. Further, the cylindrical wall of the first air inlet portion 206 is defined around the central axis of the impeller 204. Further, the first air inlet portion 206 is configured to receive fresh air from the environment. Those skilled in the art would appreciate that the scope of the disclosure is not limited to the first air inlet portion 206 having a cylindrical wall. In an embodiment, the first air inlet portion 206 may be realized through a rectangular wall or any other shaped wall without departing from the scope of the disclosure.

The impeller cover portion 212 is extended, upstream of the flow of the fresh air, to form the tubular wall 208. The tubular wall 208 is extended along a circumference of the first air inlet portion 206 to form an annular chamber 218. In another embodiment, the tubular wall 208 is extended along the circumference of the first air inlet portion 206 to form a donut shaped chamber. In an embodiment, the cross-section of the annular chamber 218 has trapezoidal shape. Further, the cross-section of the annular chamber 218 has predetermined area (represented by 316). In an embodiment, the annular chamber 218 has a first wall 220 and a second wall 222. The first wall 220 of the annular chamber 218 corresponds to a common wall between the annular chamber 218 and the first air inlet portion 206. In an embodiment, the second wall 222 of the annular chamber 218 is parallel to the first wall 220. Further, the annular chamber 218 has a first sidewall 224 and a second sidewall 226. The first sidewall 224 and the second sidewall 226 connect the first wall 220 with the second wall 222. In an embodiment, the length of the second wall 222 is less than the length of the first wall 220. Those skilled in the art will appreciate that the scope of the disclosure is not limited to the shape of cross-section of the annular chamber 218 as trapezoidal. In an embodiment, the cross section of the annular chamber 218 may bear any shape without departing from the scope of the disclosure. The tubular wall 208 is further extended radially outwards to define the second air inlet portion 228. In an embodiment, the second air inlet portion 228 is fluidly coupled with the outlet port of the filtration system 110 through the second conduit 112.

The housing 202 further includes the opening 210 formed in the cylindrical wall of the first air inlet portion 206. In an embodiment, the opening 210 has a predetermined width (represented by 314). Further, the opening 210 is extended contiguously along the circumference of the first air inlet portion 206. The opening 210 is defined in such a manner that the annular chamber 218 fluidly couples with the first air inlet portion 206. Therefore, the opening 210 is defined on the common wall of the annular chamber 218 and the first air inlet portion 206 (i.e., the first wall 220 of the annular chamber 218). As the opening 210 is defined contiguously along the circumference of the first air inlet portion 206, the opening 210 defines a first edge 230 and a second edge 232. In an embodiment, the second edge 232 is defined downstream of the first edge 230. Further, the second edge 232 includes a chamfer 322. In an embodiment, the first edge 230 and the second edge 232 are radially offset (represented by 308) from each other with respect to a central axis 302 of the first air inlet portion 206. Therefore, the radial distance 304 of the first edge 230 from the central axis 302 of the first air inlet portion 206 is different from the radial distance 306 of the second edge 232 from the central axis 302 of the first air inlet portion 206. In an embodiment, the radial distance 304 of the first edge 230 from the central axis 302 of the first air inlet portion 206 is less than the radial distance 306 of the second edge 232 from the central axis 302 of the first air inlet portion 206. The radial distance 304 further has been referred to as a distance of the opening 210 from the central axis 302 of the first air inlet portion 206. A person having ordinary skilled in the art would appreciate that the radial offset 308 between the first edge 230 and the second edge 232 corresponds to a difference between the radial distance 304 and the radial distance 306.

In an embodiment, the opening 210 is defined at an axial offset (represented by 312) from the second air inlet portion 228. In an embodiment, the axial offset 312 corresponds to a distance of the second edge 232 of the opening 210 from a central axis 310 of the second air inlet portion 228. In an embodiment, the product of the cross-sectional area 316 of the annular chamber 218, and the measure of the axial offset 312 of the opening 210, lies in the range from 2.5 inch$^3$ to 4 inch$^3$. Additionally, the opening 210 is defined at a predetermined distance (represented by 320) from the impeller plane 318. The predetermined distance 320 of the opening 210 from the impeller plane 318 corresponds to a distance of the second edge 232 from the impeller plane 318. In an embodiment, the distance of the opening 210 from the impeller plane 318 (represented by 318) lies in the range from 3 inch to 4.5 inch. In an embodiment, a ratio of the width of the opening 210 (represented by 314) to a measure of the radial offset (represented by 308) lies in a range from 10 to 25. In an embodiment, a ratio of the distance of the opening 210 from the central axis 302 of the first air inlet portion 206, to the width of the opening 210 (represented by 314) lies in a range from 8 to 23.

INDUSTRIAL APPLICABILITY

In operation, a turbine mechanically drives the impeller 204 of the compressor 114, which causes the impeller 204 to rotate. The rotary motion of the impeller 204 causes the fresh air from the environment to get sucked in towards the impeller 204 through the first air inlet portion 206. Due to the fresh air flowing across the opening 210 and due to the radial offset 308 between the first edge 230 and the second edge 232 of the opening 210, there is a drop in pressure adjacent to the second edge 232 of the opening 210 within the first air inlet portion 206. This pressure drop aids in creating a suction to remove the blow-by gases from the crankcase 104. As the blow-by gases outlet port of the crankcase 104 is fluidly coupled the inlet port of the filtration system 110 through the first conduit 108, the blow-by gases flow through the filtration system 110. Further, the pressure drop at the opening 210 aids in generating the required pressure differential across the filtration system 110 for the filtration system 110 to operate. The filtration system 110 filters out the oil droplets from the blow-by gases.

The filtered blow-by gases flows from the outlet port of the filtration system 110 towards the second air inlet portion 228 through the second conduit 112. The annular chamber 218 receives the filtered blow-by gases through the second air inlet portion 228. As the opening 210 is defined at the axially offset (represented by 312) from the central axis 308 of the second air inlet portion 228, there is no straight path available for the blow-by gases to leak into the first air inlet portion 206. In an embodiment, the blow-by gases may completely fill up the annular chamber 218. As the annular chamber 218 is completely filled with blow-by gases and the opening 210 is formed contiguously around the circumference of the first air inlet portion 206, the blow-by gases uniformly exit the annular chamber 218. Therefore, the blow-by gases uniformly mixes with the fresh air. In an embodiment, the chamfer 322 facilitates the exit of the blow-by gases from the annular chamber 218 into the first air inlet portion 206. Thereafter, the mixture of the blow-by gases and the fresh air is compressed by the impeller 204 and is fed back into the engine 102.

When the machine operates in harsh weather conditions such as extreme low temperature conditions, the temperature of the fresh air (that is sucked in the compressor 114 through the first air inlet portion 206) is below freezing point. This may cause drop in temperature of the annular chamber, which in turn causes the water vapors in the blow-by gases to condense rapidly to form of ice crystals at the opening 210. However, in accordance with the present disclosure, as the annular chamber 218 is formed from tubular wall 208 that is an extension of the impeller cover portion 212, heat generated due to rotary movement of the impeller 204 is transferred to the walls of the annular chamber 218. This causes the equivalent temperature of the annular chamber 218 to rise above the freezing point, which in turn facilitates gradual condensation of the water vapors in the blow-by gases. Hence, formation of the ice crystals is avoided and therefore damage to the compressor 114 components is avoided.

The disclosed embodiment encompass numerous advantages. The structure of the opening 210 and the annular chamber 218 allows a uniform mixing of the blow-by gases with the fresh air. Further, as the annular chamber 218 is formed as an extension of the impeller cover portion 212, the heat of the impeller 204 is transferred to the walls of the annular chamber 218, which condenses the water vapors in the blow-by gases gradually and therefore avoids ice-crystals formation.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A housing of a compressor for an internal combustion engine, the housing comprising:
   a first air inlet portion;
   a tubular wall defining an annular chamber along a circumference of the first air inlet portion, the tubular wall comprising a second air inlet portion; and
   an opening formed in a wall of the first air inlet portion, the opening contiguously extending along the circumference of the first air inlet portion, to fluidly couple the annular chamber with the first air inlet portion, the opening being formed at an offset from the second air inlet portion,
   wherein the opening defines a first edge and a second edge in the wall of the first air inlet portion,
   wherein the first edge and the second edge are radially offset from each other with respect to a central axis of the first air inlet portion, and
   wherein a ratio of a width of the opening to a measure of radial offset between the first edge and the second edge with respect to the central axis lies in a range from 10 to 25.

2. The housing of claim 1, wherein a distance from the first edge to the central axis of the first air inlet portion is less than a distance from the second edge to the central axis of the first air inlet portion.

3. The housing of claim 1, wherein the second air inlet portion has a central axis, and wherein the opening is offset from the central axis of the second air inlet portion.

4. The housing of claim 1, further comprising an impeller cover portion configured to receive an impeller, the impeller having a front end, wherein the impeller cover portion is extended to form the tubular wall.

5. The housing of claim 4, wherein a distance from the opening to an impeller plane lies in a range from 3 inch to 4.5 inch, and
   wherein the impeller plane passes through the front end of the impeller and is perpendicular to a central axis of the impeller.

6. The housing of claim 1, wherein the first air inlet portion is configured to receive fresh air.

7. The housing of claim 6, wherein, along a flow path of the fresh air in the first air inlet portion, the second edge is defined downstream of the first edge.

8. The housing of claim 1, wherein the second air inlet portion is fluidly coupled to a crankcase of the internal combustion engine through a conduit, wherein the annular chamber receives blow-by gases from the crankcase through the second air inlet portion.

9. The housing of claim 8, wherein the second edge includes a chamfer that facilitates exit of the blow-by gases from the annular chamber to the first air inlet portion.

10. The housing of claim 8, wherein the first edge and the second edge create a pressure drop that facilitates a flow of the blow-by gases from the crankcase to the annular chamber through the second air inlet portion.

11. The housing of claim 1, wherein a product of a measure of the offset and a cross-sectional area of the annular chamber, lies in a range from 2.5 $inch^3$ to 4 $inch^3$.

12. The housing of claim 1, wherein a ratio of a distance from the opening to the central axis of the first air inlet portion, and a width of the opening, lies in a range from 8 to 23.

13. A compressor for an internal combustion engine, the compressor comprising:
   a first air inlet portion configured to receive fresh air;
   a tubular wall defining an annular chamber along a circumference of the first air inlet portion, the tubular wall comprising a second air inlet portion, wherein the annular chamber is configured to receive blow-by gases from the second air inlet portion;
   an opening formed in a wall of the first air inlet portion, the opening contiguously extending along the circumference of the first air inlet portion, to fluidly couple the annular chamber with the first air inlet portion, the opening being formed at an offset from the second air inlet portion,
   wherein the opening defines a first edge and a second edge in the wall of the first air inlet portion,
   wherein the first edge and the second edge are radially offset from each other with respect to a central axis of the first air inlet portion, and
   wherein the blow-by gases exit the annular chamber into the first air inlet portion through the opening when the blow-by gases fill the annular chamber; and
   an impeller disposed in an impeller cover portion, the impeller being configured to receive and compress the fresh air and the blow-by gases, wherein the impeller cover portion is extended to form the tubular wall,
   wherein a ratio of a distance from the opening to the central axis of the first air inlet portion, and a width of the opening, lies in a range from 8 to 23.

14. The compressor of claim 13, wherein a product of a measure of the offset and a cross-sectional area of the annular chamber, lies in a range from 2.5 $inch^3$ to 4 $inch^3$.

15. The compressor of claim 13, wherein a ratio of a width of the opening to a measure of radial offset lies in a range from 10 to 25.

16. A crankcase ventilation system for an internal combustion engine, the crankcase ventilation system comprising:
   a crankcase of the internal combustion engine;
   a compressor comprising:
   a first air inlet portion;
   a tubular wall defining an annular chamber along a circumference of the first air inlet portion, the tubular wall comprising a second air inlet portion that is coupled with the crankcase of the internal combustion engine through a conduit;
   an opening formed in a wall of the first air inlet portion, contiguously extending along the circumference of the first air inlet portion, to fluidly couple the annular chamber with the first air inlet portion, the opening being formed at an offset from the second air inlet portion, wherein the opening defines a first edge and a second edge in the wall of the first air inlet portion, wherein the first edge and the second edge are radially offset from each other with respect to a central axis of the first air inlet portion; and
   an impeller disposed in an impeller cover portion of the compressor,
   wherein the impeller cover portion is extended to form the tubular wall,
   wherein a product of a measure of the offset and a cross-sectional area of the annular chamber, lies in a range from 2.5 $inch^3$ to 4 $inch^3$.

17. The crankcase ventilation system of claim 16, wherein a ratio of a width of the opening to a measure of radial offset between the first edge and the second edge with respect to the central axis lies in a range from 10 to 25.

* * * * *